Oct. 17, 1950 H. F. OLIVER Re. 23,286

SECURING DEVICE

Original Filed Dec. 4, 1944

INVENTOR.
Herbert F. Oliver.
BY Wesley C. Ross
Attorney.

Reissued Oct. 17, 1950 Re. 23,286

UNITED STATES PATENT OFFICE 23,286

SECURING DEVICE

Herbert F. Oliver, West Springfield, Mass., assignor to The F. W. Sickles Company, Chicopee, Mass., a corporation of Massachusetts Original No. 2,450,252, dated September 28, 1948, Serial No. 566,567, December 4, 1944. Application for reissue December 3, 1948, Serial No. 63,301

11 Claims. (Cl. 248—361)

Matter enclosed in heavy brackets [ ] appears in the original patent but forms no part of this reissue specification; matter printed in italics indicates the additions made by reissue

This invention relates to improvements in securing means and is directed more particularly to devices for releasably securing objects together.

The principal objects of the invention are directed to the provision of a device for securement to an object that is adapted for releasably engaging another object and arranged to hold the objects in releasable association.

The device of the invention is adapted for broad application and while it may be used for securing various objects together it will for purpose of disclosure be described in connection with securing the shield of radio apparatus to the chassis thereof.

It is customary in radio apparatus to provide a chassis formed from metal and to secure thereto shields or closures which enclose various components of the apparatus. Various means have been employed for this purpose but are difficult to manipulate and expensive to produce.

According to this invention securing means is provided which is simple in form and is so constructed and arranged as to be automatic in operation. That is, the device of the invention may be secured to one part such as a shield and the shield may be brought into association with the chassis or other part in such a way that the parts are relatively locked in the desired relation.

It will be understood that while the invention will be described in connection with a shield and chassis of radio apparatus that the invention is not to be so limited.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
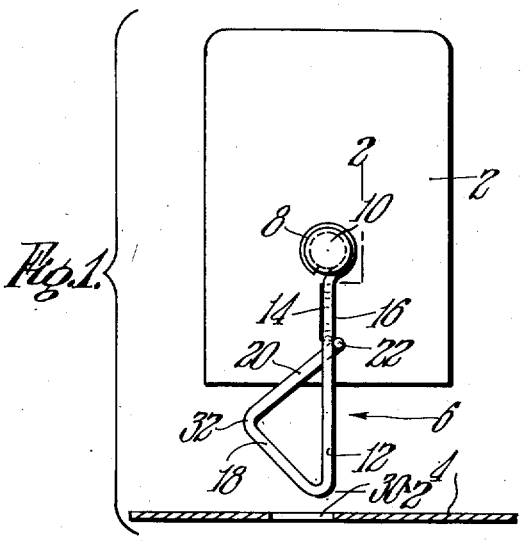
Fig. 1 is a front elevational view of the securing device of the invention shown attached to an object such as a shield.
Figure 2:
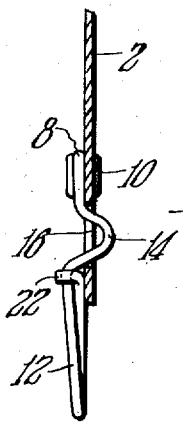
Fig. 2 is a sectional elevational view on the line 2—2 of Fig. 1.

Referring to the drawings more in detail, the invention will be fully described.

2 represents a shield such as employed in connection with radio apparatus. This is usually in the form of a receptacle which is to be slipped over to enclose a coil, tube or the other component of the apparatus. 4 represents a portion of a chassis or plate with which the shield is to be associated. In radio apparatus it is desired and necessary that the shield 2 make a good contact with the plate 4.

The device of the invention may take the form of a clip 6 which has an eye 8 that is secured as by a rivet or the like 10 to a wall of the shield. A body portion 12 of the clip extends from the eye 8 and has an offset portion 14 which will be disposed in a slot 16 provided in the shield. The offset portion 14 in the slot 16 prevents turning of the clip on the shield. A cam portion 18 of the clip extends angularly from the main body portion 12 and from its upper end there extends in angularly disposed relationship an end portion 20 which underlies the main body portion 12 and has its extremity 22 bent upwardly, as shown. The portions 12 and 18 are in diverging relation.

The clip will preferably be made from spring-like material or material that is yieldable or resilient, so that the portions 18, 12 and 20 are relatively yieldable.

Figure 3:
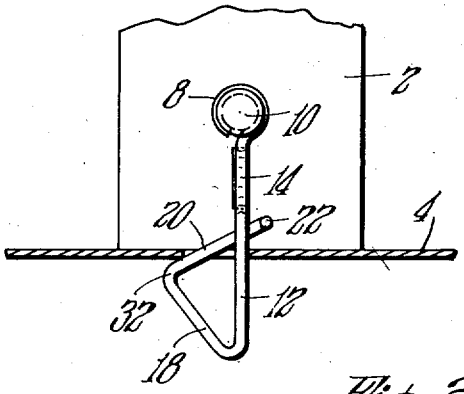
Fig. 3 is a view similar to Fig. 1 to explain the operation of the device.

The plate 4 to which the shield 2 is to be secured is provided with a clip receiving hole 30. In securing the shield and plate together they are moved towards one another so that the outer end of the body portion 12 and portion 18 of the clip are inserted in the hole 30. By applying the necessary amount of pressure to the parts the part 18 of the clip is acted upon by the edge of the hole 30 so that it is swung inwardly towards the part 12 whereby the jointure 32 of the parts 18 and 20 or the wider part of the clip passes through the hole 30. That is, part 18 is cammed inwardly or parts 18 and 12 are brought toward one another by opposite edges of the hole so that the wider part of the clip may pass through the hole. In other words, as the clip is inserted into the hole 30 it is contracted and when the jointure 32 has passed through the hole part 18 swings counterclockwise away from part 12. Then the part 20 yieldingly engages the lower edge of the hole 30 as shown in Fig. 3.

The clip is so constructed and arranged that the part 20 thereof presses upwardly against the lower edge of the hole 30 with a yielding pressure thereby to hold the shield and plate 4 in the desired assembled contacting relation.

When it is desired to separate the shield and plate the parts 12 and 18 may be squeezed towards one another thereby to reduce the overall width of the clip so it may be withdrawn through the hole. Or in another way, the part 20 or the part 22 of the clip may be pushed on so as to bring about the desired reduction of the overall width of the clip.

Figure 4:
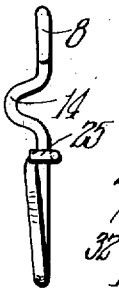
Figs. 4 and 5 are side elevational views of another form of device embodying the features of the invention.
Figure 5:
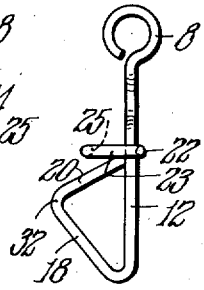

In the form of the invention shown in Figs. 4 and 5 the end portion 22 is bent upwardly and extends across the main body portion as at 23 with its extremity 25 bent outwardly.

The part 22 in all forms of the clip acts as a stop to limit spreading of the parts 18 and 12. The part 25 abuts the side of the body 12 to limit relative movement thereof when the parts 12 and 18 are squeezed together.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

I claim:

1. A device of the class described for securing objects together comprising a clip formed from a single length of yieldable wire to have, a portion at its upper end for securing to an object, a body portion extending therefrom, a cam portion extending upwardly in a diverging relation from the lower end of said body portion at one side thereof, an end portion extending in a diverging relation from the upper end of said cam portion having an endmost portion disposed rearwardly of said body portion and provided with an extremity extending outwardly at an opposite side of the body portion, and across said body portion and then inwardly, said outwardly and inwardly extending portions adapted to engage said body portions to limit movements of the cam and end portions relative to the body.

2. A device of the class described for securing objects together comprising a member made from a length of yieldable wire having an upper part for securing to an object and a body portion extending downwardly therefrom, a cam portion diverging upwardly from the lower end of said body portion, an end portion diverging from the upper end of said cam portion and extending adjacent said body portion, and an extremity of said end portion bent upwardly at a side of said body portion to limit the divergence of said body and cam portions.

3. A device of the class described for securing objects together comprising a clip formed from a single length of yieldable wire having a portion at its upper end for securing to an object, a body portion extending downwardly therefrom, a cam portion diverging upwardly from the lower end of said body portion at one side thereof, an end portion diverging from the upper end of said cam portion and extending beneath said body portion, and the extremity of said end portion extending upwardly at an opposite side of said body portion to limit the divergence of said body and cam portions.

4. The combination of an object and a device for securing said object to a second object in which said securing device comprises a clip formed from a single length of yieldable wire having an upper part for articulately securing said device to said object, a body portion extending downwardly therefrom, a cam portion diverging upwardly from the lower end of said body portion, an end portion diverging from the upper end of said cam portion and extending adjacent said body portion, an extremity of said end portion bent upwardly at a side of the body portion to limit the divergence of said body and cam portions, said body portion being provided with an offset portion disposed between its upper and lower ends, and said object having an aperture so as to receive another offset portion, whereby said body portion is maintained in fixed relationship to said object.

*5. The combination of an object and a device for securing said object to a second object, in which said securing device comprises a clip having an upper part for articulately securing said device to said object, a body portion extending downwardly therefrom, a cam portion diverging upwardly from the lower end of said body portion, and an end portion diverging from the upper end of said cam portion, said device and said object having interlocking parts, whereby said device is maintained in fixed relationship to said object.*

*6. The combination of an object and a device for securing said object to a second object, in which said securing device comprises a clip having an upper part for articulately securing said device to said object, a body portion extending downwardly therefrom, a cam portion diverging upwardly from the lower end of said body portion, and an end portion diverging from the upper end of said cam portion, said body portion and said object having interlocking parts, whereby said body portion is maintained in fixed relationship to said object.*

*7. The combination of an object and a device for securing said object to a second object, in which said securing device comprises a clip having an upper part for articulately securing said device to said object, a body portion extending downwardly therefrom, a cam portion diverging upwardly from the lower end of said body portion, and an end portion diverging from the upper end of said cam portion, said object having a part which interlocks with said body portion between the upper and lower ends of said body portion, whereby said body portion is maintained in fixed relationship to said object.*

*8. The combination of an object and a device for securing said object to a second object, in which said securing device comprises a clip formed from a single length of yieldable wire having an upper part for securing said device to said object so that said device is rotatable thereon, a body portion extending downwardly therefrom, a cam portion diverging upwardly from the lower end of said body portion, and an end portion diverging from the upper end of said cam portion and extending adjacent to said body portion, and in which there is cooperating structure on said device and said object to prevent rotation of one with respect to the other.*

*9. The combination of an object and a device for securing said object to a second object, in which said securing device comprises a clip formed from a single length of yieldable wire having an upper part for securing said device to said object so that said device is rotatable there-*

*on, a body portion extending downwardly therefrom, a cam portion diverging upwardly from the lower end of said body portion, and an end portion diverging from the upper end of said cam portion and extending adjacent to said body portion, and in which there is cooperating structure on said object and said body portion to prevent rotation of said device with respect to said object.*

*10. The combination of an object and a device for securing said object to a second object, in which said securing device comprises a clip formed from a single length of yieldable wire having an upper part for securing said device to said object so that said device is rotatable thereon, a body portion extending downwardly therefrom, a cam portion diverging upwardly from the lower end of said body portion, and an end portion diverging from the upper end of said cam portion and extending adjacent to said body portion, said object having a part which interlocks with said body portion between the upper and lower ends of said body portion to prevent rotation of said device with respect to said object.*

*11. The combination of an object and a device*

*for securing said object to a second object, in which said securing device comprises a clip formed from a single length of yieldable wire having an upper part for securing said device to said object so that said device is rotatable thereon, a body portion extending downwardly therefrom, a cam portion diverging upwardly from the lower end of said body portion, and an end portion diverging from the upper end of said cam portion and extending adjacent to said body portion, said body portion and said object having interlocking parts, whereby said body portion is maintained in non-rotatable relationship to said object.*

HERBERT F. OLIVER.

REFERENCES CITED

The following references are of record in the file of this patent or the original patent:

UNITED STATES PATENTS

| Number | Name | Date |
|---|---|---|
| 2,084,624 | Place | June 22, 1937 |
| 2,197,590 | Place | Apr. 16, 1940 |
| 2,353,795 | Tinnerman | July 18, 1944 |
| 2,450,252 | Oliver | Sept. 28, 1948 |